United States Patent [19]
Reiland

[11] 3,812,757
[45] May 28, 1974

[54] THREADED FASTENER WITH TORQUE CONTROL HEAD
[75] Inventor: Bernard F. Reiland, Rockford, Ill.
[73] Assignee: Textron Inc., Rockford, Ill.
[22] Filed: Jan. 27, 1972
[21] Appl. No.: 221,399

Related U.S. Application Data
[63] Continuation of Ser. No. 873,915, Nov. 4, 1969, abandoned.

[52] U.S. Cl. .................................................. 85/61
[51] Int. Cl. ............................................ F16b 31/02
[58] Field of Search ............................. 85/61, 1, 45

[56] References Cited
UNITED STATES PATENTS

| | | | |
|---|---|---|---|
| 1,087,024 | 2/1914 | Linuo.................................. | 85/45 |
| 1,261,916 | 4/1918 | Forbes................................. | 85/45 |
| 3,236,141 | 2/1966 | Smith.................................. | 85/45 |
| 3,285,119 | 11/1966 | Dean et al. ........................ | 85/61 |
| 3,352,190 | 11/1967 | Carlson.............................. | 85/45 |
| 3,369,441 | 2/1968 | Kosan................................ | 85/45 |
| 3,400,626 | 9/1968 | Beroere............................. | 85/45 |
| 3,463,209 | 8/1969 | Podolsky........................... | 85/45 |
| 3,498,174 | 3/1970 | Schuster et al. .................. | 85/61 |

FOREIGN PATENTS OR APPLICATIONS

| | | | |
|---|---|---|---|
| 24,011 | 1/1895 | Great Britain.................... | 85/48 |
| 512,073 | 8/1939 | Great Britain.................... | 85/45 |
| 898,026 | 6/1962 | Great Britain.................... | 85/61 |

*Primary Examiner*—Edward C. Allen
*Attorney, Agent, or Firm*—Olson, Trexler, Wolters, Bushnell & Fosse, Ltd.

[57] ABSTRACT

A threaded bolt has an enlarged hexagonal auxiliary driving head and an outwardly adjoining smaller main driving head. The small driving head is dimensioned so that it will shear from the remainder of the bolt under an applied driving torque which approximates the seating torque of the bolt. Thus when the bolt is screwed into a workpiece by applying a driving tool to the small driving head, the small head shears from the bolt when the bolt is fully seated and tightened in an assembly under a tensile load approximating the design load of the bolt. The large hole is used in removing the fastener from the assembly.

7 Claims, 11 Drawing Figures

PATENTED MAY 28 1974 3,812,757

THREADED FASTENER WITH TORQUE CONTROL HEAD

REFERENCE TO RELATED APPLICATION

This application is a continuation of U.S. application Ser. No. 873,915, filed Nov. 4, 1969, now abandoned.

BACKGROUND OF THE INVENTION

1. Field of the Invention

The present invention relates to a threaded fastener having a built-in torque control feature for indicating when a predetermined torque is applied to the fastener in driving the fastener into a parent body.

2. Description of the Prior Art

The conventional manner of applying a threaded fastener to an assembly and ensuring that the fastener is seated under a desired tension is to use a manual or power torque wrench which is designed to drive a fastener into a parent body until a preset applied torque level is reached. However, such adjustable torque-wrenching tools are subject to human error in setting the desired driving torque. Such tools are also subject to mechanical malfunction whereby the torque actually applied to the fastener may differ from the torque setting of the tool. Furthermore, in using a torque wrench, it is impossible to tell by visual inspection whether or not a given fastener has been driven into an assembly with the desired torque.

The foregoing shortcomings of adjustable torque-driving tools have led others to suggest fasteners having a built-in applied torque-limiting feature. In the past, the most commonly suggested torque control fasteners had a driving head or nut joined to another portion of the fastener by a narrow neck portion designed to fracture when a predetermined torque is applied to the fastener. However, fasteners of this type are difficult and expensive to manufacture because the shearable neck must be formed either by a separate shaving operation or by fabricating the fastener in two separate parts and then joining the two parts at the neck. In either case, the resulting torque control feature is likely to give inconsistent and unpredictable results because of the difficulty in providing close tolerances in the shearable cross section of the fastener.

SUMMARY OF THE INVENTION

In the present invention the foregoing problems of the prior art are overcome by providing a threaded fastener having a double driving head with no intervening neck and with the shearable cross section of the fastener being provided in the tool engaging portion of the primary driving head itself. The shearable driving head is extruded to its final shape and dimensions for accurate, consistent torque control.

In one aspect of the invention the threaded fastener has two juxtaposed driving heads including a small shearable outer head for driving the fastener into a parent body and a larger inner head for removing the fastener from an assembly. The small outer head is carefully dimensioned to have less torsional strength than the remainder of the fastener so that such head will shear off when a predetermined torque is applied to it in driving the fastener home. The large inner head has greater torsional strength than the remainder of the fastener so that it can be used to remove the fastener from its assembly.

In a further aspect of the invention, the shearable head is carefully dimensioned to fail in shear under an applied torque approximating the seating torque of the fastener so that such head will shear off only when the fastener has been seated in an assembly under a tensile stress within the elastic limit of the fastener. In this manner the fastener is inhibited from loosening during usage.

In another aspect of the invention the fastener is formed from a single metal workpiece, with the critical dimensions of the shearable head and the diameter of the shank to be threaded being determined by a single extrusion operation for accurate torque control.

Another feature is the provision of exterior or interior wrenching surfaces of special reversely curving, modified hexagonal form on the small main driving head for positive torque application without slippage.

A primary object of the invention is to provide a fastener which accurately controls the amount of torque applied to it in driving it into a parent body.

Another primary object is to provide a fastener which controls indirectly the amount of tension applied to it in an assembly.

Another object is to provide a fastener giving the foregoing torque control without the use of power or hand-driven torque-wrenching tools.

A further object is to provide a fastener having the foregoing characteristics which can be manufactured easily and inexpensively using conventional cold heading machinery.

Another object is to provide a fastener as aforesaid, the critical dimensions of which are determined and carefully controlled by extrusion.

Still another important object is to provide a fastener as aforesaid which can be inspected visually to determine if the fastener has been tightened to the required degree.

BRIEF DESCRIPTION OF THE DRAWINGS

The foregoing and other objects and advantages of the present invention will become more apparent from the following detailed description which proceeds with reference to the accompanying drawing wherein.

DETAILED DESCRIPTION

Figure 5:
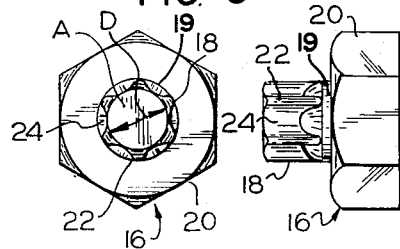
FIG. 5 is a view of the head end of the finished fastener in accordance with the invention.

1. FIG. 5 Embodiment

Figure 6:
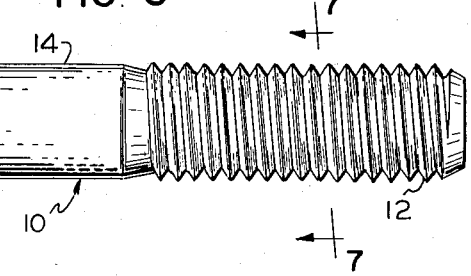
FIG. 6 is a side view of a finished fastener in accordance with the invention.

A fastener in accordance with the invention is shown in FIGS. 5 and 6 of the drawings The fastener includes an elongated shank 10 including a screw-threaded shank portion 12 for threading into a parent body 65 (FIG. 8) and an unthreaded shank portion 14 for insertion within an assembly 62, 63 to be fastened together. A double driving head portion 16 is formed integral wiith the unthreaded end of the shank. The double-headed portion includes a first, small outer driving head 18 for driving the fastener into a parent body. A second, large inner hexagonal head 20 adjoins the outer head 18 and is used to remove the fastener from the assembly.

The small outer head 18 is a so-called "Torx" driving head having a series of convexly curved tool engaging surfaces forming six projections 22 separated by concave tool engaging surfaces 24 in a manner that permits a matching driving tool to supply a positive driving torque without slipping of the tool or rounding of the projections. An intermediate portion 19 is provided inwardly of the tool engaging surfaces of the outer or first driving head 18, and joins said first driving head 18 directly to the second driving head 20. As can be seen from the drawings this intermediate portion 19 is of a generally circular cross section, and is larger in area than the area of said first driving head 18. Although the Torx head configuration disclosed is preferred for the small outer head, such head may be provided with any other suitable driving means. The Torx head is described more completely in pending U.S. Pat. application Ser. No. 624,853, filed Mar. 21, 1967.

In accordance with the invention, outer driving head 18, having a given shape dictated by the type of wrenching surfaces provided, is dimensioned so that it fails in shear before any other portion of the fastener fails in shear or tension upon applying a driving torque to such head in threading the fastener into an assembly. More particularly, head 18 is dimensioned so that it fails in shear under an applied torque approximating the seating torque of the fastener. The seating torque is that torque which must be applied to driving head 18 under given driving conditions in order to drive washer face 35 on the underside of enlarged head 20 into abutment against the adjacent surface of the assembly 62, 63 to be fastened together and to place the fastener under a predetermined tension or design load $y$ in the assembly.

Figure 8:
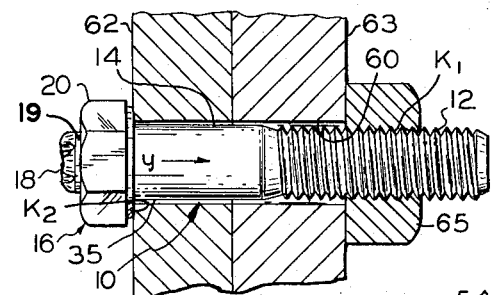
FIG. 8 is a side view of the fastener of FIG. 6 after its application to an assembly.

The required seating torque varies with driving conditions, principally with the coefficient of friction $K_1$ between the external threads 12 of the fastener and the mating internal threads of the nut 65 and the coefficient of friction $K_2$ between washer face 35 and the outer surface of assembly member 62 of FIG. 8. Of course, these coefficients vary depending on such factors as the amount of thread clearance or interference, the surface finish of the fastener and the type of lubricant, if any, present during application of the fastener to the assembly.

Normally, the design seating torque of the fastener is furnished by the customer, and from this information the dimensions of driving head 18 are determined. In general, the lower the coefficients of friction $K_1$ and $K_2$, the smaller driving head 18 must be to ensure that the design load $y$ of the fastener will not be exceeded when the head shears off. Conversely, the larger design load $y$ and thus the larger the required seating torque, the larger must be the dimensions of driving head 18. In any event, design load $y$ is selected so as to be within the elastic limit of the metal in the shank so that the assembled fastener resists loosening during use.

The illustrated embodiment of FIGS. 5 and 6 has a total cross-sectional area A through a section of outer head 18 in the area of the tool engaging portion which is less than the minimum cross-sectional area A' through the threaded shank portion 12. Expressed differently, the minimum diameter D across the tool engaging portion of outer head 18 is less than the minor diameter D' of the thread formation on shank portion 12. Thus when driving torque is applied to the outer head, such head shears off before the shank fails. Nevertheless, the cross-sectional area and minimum diameter of the tool engaging portion of outer head 18 are sufficiently large to ensure that the fastener is driven home into its parent body and fully seated and tightened to the desired extent in an assembly when the outer head shears off, under predetermined driving conditions.

Hex head 20 has a cross-sectional area and minimum diameter which are greater than the corresponding dimensions of threaded shank portion 12 or any other portion of the fastener. These features ensure that the hex head has greater torsional strength than the shank so that such head will not fail when a wrenching tool is applied to it for removing the fastener from an assembly after the outer head has been sheared off.

Figure 9:
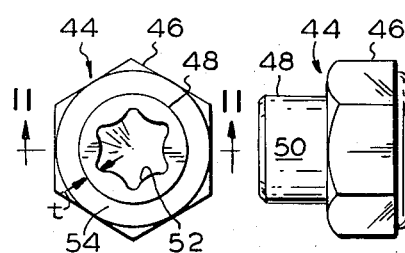
FIG. 9 is a view of the head end of a modified form of fastener in accordance with the invention.

2. FIG. 9 Embodiment

Figure 10:
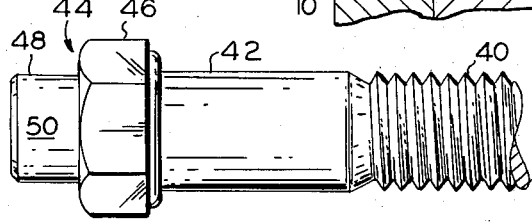
FIG. 10 is a side view of the fastener of FIG. 9.
Figure 11:
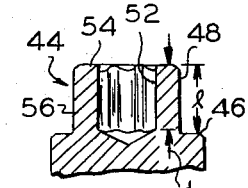
FIG. 11 is a sectional view taken along the line 11—11 of FIG. 9.

FIGS. 9, 10 and 11 disclose a modified form of fastener in accordance with the invention including a threaded shank portion 40, unthreaded shank portion 42 and double head portion 44. Double head portion 44 includes a large hex inner auxiliary head 46 adjoining unthreaded shank portion 42 and a smaller outer main driving head 48 adjoining the inner head.

The modified fastener differs from the fastener of FIGS. 5 and 6 only in the configuration of outer head 48. Such outer head has a cylindrical external surface 50 with a socket 52 extending inwardly from outer end surface 54. Socket 52 defines internal Torx wrenching surfaces shaped like the external wrenching surfaces of the fastener of FIG. 5 and described in the aforementioned copending application, Ser. No. 624,853. Thus positive torque application without slippage is also a feature of head 48.

The walls 56 defined by socket 52 and exterior surface 50 have a minimum thickness $t$ such that when driving torque is applied to the small head, the ultimate shear strength of the metal in walls 56 is reached well before the ultimate strength of the metal in the shank, in either shear or tension, is approached. Thus the small head is designed to shear through a cross section of wall 56 when a predetermined torque is applied. This shear torque is selected so as to be sufficient to drive the fastener home into an assembly and place the shank in tension under preselected conditions of application. That is, such shear torque approximates the seating torque of the fastener.

Referring to FIG. 11, the total depth $d$ of the wrenching surfaces of socket 52 approximates the total external length $l$ of the small head so that wall 56 extends throughout the length of the small head and shear will normally occur at the intersection of the small and large heads. In any event, depth $d$ should not exceed length $l$ to any substantial extent. Otherwise the wrenching socket would extend into large head 46 and might develop excessive driving torques which could break the driving tool or screw shank.

A socket head fastener as described has certain advantages in manufacturing. For example, the design applied torque at which the small head shears off can be varied as desired simply by increasing or decreasing the outer diameter of the small head. This variation in turn can be accomplished by a simple change in the tooling of the machinery used to form the head.

3. Manufacture

Figure 7:
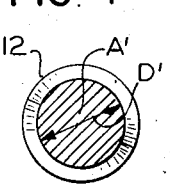
FIG. 7 is a sectional view taken along the line 7—7 of FIG. 6.

The preferred method of manufacturing the invention will be described with reference to the fastener embodiment of FIGS. 5, 6 and 7.

Figure 3:
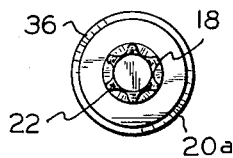
FIG. 3 is a view of the head end of the blank of FIG. 1 following an intermediate step in the formation of the fastener.
Figure 4:
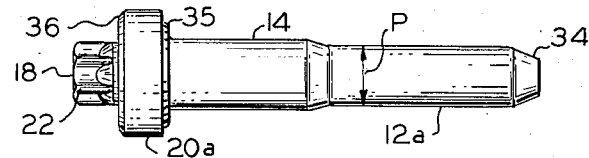
FIG. 4 is a side view of the blank of FIG. 3.

The importance of accurate dimensional control of the shearable cross section of head 18 for accurate torque control of the fastener will be readily appreciated. To ensure close dimensional control of the shearable cross section of head 18 and dimensional uniformity in different fasteners, both shank portion 12a to be threaded, shown in FIG. 4, and outer driving head 18 are extruded. In fact, both portions are preferably extruded simultaneously in a single cold-forming operation which may be performed in a conventional cold-heading machine. At the same time, a circular enlarged head portion 20a is upset to a dimension corresponding approximately to the maximum dimension of the final hexagonal inner head 20 as shown in FIGS. 3 and 4.

Figure 1:
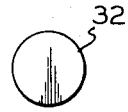
FIG. 1 is an end view of a blank used to form a fastener in accordance with the present invention.
Figure 2:
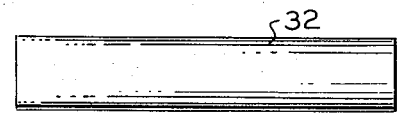
FIG. 2 is a side view of the blank of FIG. 1.

The manufacturing process from start to finish is as follows:

A cylindrical blank 32 as shown in FIGS. 1 and 2 is cut from a length of rod or wire material, depending on the final dimension of the finished fastener. The diameter of the blank corresponds substantially to the diameter of the unthreaded portion 14 of the finished fastener.

Blank 32 is fed into a cold header die whereupon a mating header punch with a single blow (1) extrudes outer head portion 18 to its final shape and dimension, (2) extrudes shank portion 12a to be threaded to the pitch diameter $p$ of the threads to be formed on such portion, (3) forms a conical tip 34 at the shank end of the blank, (4) upsets a circular head portion 20a to a dimension approximating the maximum dimension of the hex inner head 20 to be formed, and (6) simultaneously forms a washer face 35 and chamfer 36 on the upset head portion 20a.

The blank shown in FIGS. 3 and 4 is then transferred to a trim die and punch where the circular upset head portion 20a is trimmed to form hex head 20 as shown in FIGS. 5 and 6.

Following the head-trimming operation, the thread formation 12 is roll-threaded on shank 12a in conventional thread-forming dies in accordance with techniques well known in the art.

From the foregoing, it will be apparent that the critical cross-sectional dimensions of the fastener, including those in shearable head 18 and the control dimensions of shank portion 12a are cold-formed by extrusion, without the necessity of any subsequent machining operations. This technique provides accurate dimensional control of the critical cross sections within narrow limits and also assures a uniform product.

The fastener of FIGS. 9, 10 and 11 would be manufactured by a method similar to that described above. Wrenching socket 52 would be punched in the first forming step, simultaneously with the extrusion of the outer surface of the small head and the reduced shank portion to be threaded to their outer and pitch diameters, respectively.

4. Application

In use, the fastener, whether of the FIG. 5 or FIG. 9 form, is inserted through a pilot hole 60 of an assembly to be fastened together as shown in FIG. 8, including plates 62, 63. The protruding threaded shank portion is threaded into an internally threaded parent body such as a nut 65 by applying a matching wrenching tool (not shown) to the small outer driving head. Driving torque is applied to the outer head until such head is sheared from the bolt. Because of the dimensional control of the outer head, this will occur when the bolt is fully driven home with the inner head in seated engagement with the assembly and with the bolt under tension within the elastic limit of the fastener. Subsequently, the bolt can be removed for servicing of the assembly by applying a wrench to the large hex head.

A primary advantage of a fastener as described is the accurate torque control made possible without the necessity of using special torque wrenches.

Another important advantage is that the fastener can be inspected visually to determine if it has been properly tightened in the assembly. If the outer head is observed to be sheared off, the observer knows that the fastener has been fully driven home in the assembly and tightened to at least the predetermined minimum torque required to shear off the outer head as determined by the design torsional strength of such head.

For example, if an applied torque of, say, 100 to 135 foot-pounds is required to seat the fastener in an assembly under selected driving conditions, the outer driving head is dimensioned so that it will fracture in shear when this amount of driving torque is applied to it. The remaining cross sections of the fastener are dimensioned to have a torsional breaking strength substantially greater than this value to ensure that the outer head will fail before any other portion of the fastener.

Having illustrated and described the principles of my invention in two preferred embodiments, it should be apparent that the same permit of modification in arrangement and detail. I intend not to be limited to the specific embodiments disclosed but to include within the scope of my invention all such modifications and equivalent constructions.

I claim:

1. A fastener comprising: a screw threaded shank; two driving heads integral with said shank and including a first head for seating said fastener, and a second head for unseating said fastener, each driving head including a plurality of radial variations which define tool engaging surfaces, the radial variations on said first driving head defining the tool engaging surfaces being provided by an internal socket which defines a circumferential wall, with the radial variations on said second driving head being on the exterior thereof, wherein said tool engaging surfaces provided by the radial variations include a plurality of inwardly extending projections defined by a first series of arcuately curved surfaces alternating with a second series of arcuately curved surfaces curving in an opposite direction, the two said series being disposed symmetrically about the central axis of said fastener, the cross-sectional area through the tool engaging surfaces of said second driving head being greater than that of said shank, such that said second driving head has a torsional breaking strength greater than that of said shank, and said first driving head having a cross-sectional area through its tool engaging surfaces that is less than the cross-sectional area of said shank, said first driving head correspondingly having a torsional breaking strength less than said shank, said first head being disposed axially outwardly of said second head and joined directly thereto in the absence of an intervening neck portion having a lesser cross-sectional area than said first driving head, such that upon seating of said fastener, said first driving head will fail in shear across said tool engaging surfaces before said shank or said second driving head, the torsional breaking strength of said first driving head being determined so that said head will fail in shear when the driving torque applied thereto, approximates a preselected value, which is sufficient under predetermined driving conditions to drive said fastener into a parent body and place said shank under a predetermined tensile load without stripping the threads on said shank.

2. A fastener as defined in claim 1 wherein said internal socket extends axially inward to a depth sufficient to permit a tool to be engaged therein, but insufficient to permit engagement of said tool with said second driving head such that the seating torque applied by said tool is applied to said first driving head whereby the circumferential wall structure of said first driving head will fail in shear prior to failure of said shank or said second driving head.

3. A fastener as defined in claim 1, wherein said projections are six in number to provide a hex-lobular array.

4. A fastener comprising: a screw threaded shank; two driving heads integral with said shank and including a first head for seating said fastener, and a second head for unseating said fastener, each driving head including a plurality of radial variations which define tool engaging surfaces; said tool engaging surfaces on said first head including a plurality of outwardly disposed projections defined by a first series of arcuately curved surfaces alternating with a second series of arcuately curved surfaces curving in a direction opposite that of the first series, the two said series being disposed symmetrically in a lobular array about the central axis of said fastener, the cross-sectional area through the tool engaging surfaces of said second driving head being greater than that of said shank, such that said second driving head has a torsional breaking strength greater than that of said shank, and said first driving head having a cross-sectional area through its tool engaging surfaces that is less than the cross-sectional area of said shank, said first driving head correspondingly having a torsional breaking strength less than said shank, said first head being disposed axially outwardly of said second head and joined directly thereto in the absence of an intervening neck portion having a lesser cross-sectional area than said first driving head, such that upon seating of said fastener, said first driving head will fail in shear across said tool engaging surfaces before said shank or said second driving head, the torsional breaking strength of said first driving head being determined so that said head will fail in shear when the driving torque applied thereto, approximates a preselected value, which is sufficient under predetermined driving conditions to drive said fastener into a parent body and place said shank under a predetermined tensile load without stripping the threads on said shank.

5. A fastener as defined in claim 4 further including an intermediate portion disposed axially inward of said tool engaging surfaces and joining said first driving head directly to said second driving head, said intermediate portion having a cross-sectional area greater than that of said tool engaging portion and correspondingly a torsional breaking strength greater than that of said tool engaging portion.

6. A fastener as defined in claim 4 wherein said projections are six in number providing a hex-lobular array.

7. A fastener comprising: a screw threaded shank a pair of tandem, integral driving heads with a first driving head for initially seating said fastener and a second driving head for unseating said fastener, each said driving head having a plurality of tool engaging surfaces formed thereon, with the surfaces on said first driving head being defined by a plurality of radial projections, and being disposed generally parallel to the axis of the fastener, said tool engaging surfaces on said first head including six projections defined by a first series of arcuately curved surfaces alternating with a second series of arcuately curved surfaces curving in a direction opposite that of the first series, the two said series being disposed symmetrically in a hex-lobular array about the central axis of said fastener, said second driving head having a cross-sectional area through said tool engaging surfaces thereof which is greater than that of said shank, said second driving head therefore having a torsional breaking strength greater than that of said shank, and said first driving head having a cross-sectional area through the tool engaging surfaces thereof that is less than that of said shank, thereby providing said first driving head with a torsional breaking strength less than that of said shank and said second head, said first driving head being disposed axially outward of said second head and joined directly thereto in the absence of an intervening neck portion of lesser cross-sectional area than any portion of said first driving head, said first driving head including a tool engaging portion having said tool engaging surfaces formed thereon and an intermediate portion joining said first driving head directly to said second driving head, said intermediate portion having a cross-sectional area greater than that of said tool engaging portion and correspondingly greater torsional breaking strength than said tool engaging portion whereby upon seating of said fastener, said first head will fail in shear across the tool engaging surfaces thereof proximate the juncture of said tool engaging portion and said intermediate portion before failure of said shank or said second driving head.

* * * * *